(12) United States Patent
Benedetto

(10) Patent No.: US 12,536,367 B2
(45) Date of Patent: Jan. 27, 2026

(54) USING ARTIFICIAL INTELLIGENCE TO GENERATE CUSTOMIZED SUMMARIES OF CONVERSATIONS

(71) Applicant: Sony Interactive Entertainment Inc., Tokyo (JP)

(72) Inventor: Warren Benedetto, Foothill Ranch, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 172 days.

(21) Appl. No.: 18/203,617

(22) Filed: May 30, 2023

(65) Prior Publication Data
US 2024/0403540 A1 Dec. 5, 2024

(51) Int. Cl.
| | |
|---|---|
| G06F 40/35 | (2020.01) |
| G06F 40/166 | (2020.01) |
| G10L 15/18 | (2013.01) |
| G10L 15/22 | (2006.01) |
| H04L 51/046 | (2022.01) |
| H04L 51/216 | (2022.01) |
| G10L 15/08 | (2006.01) |

(52) U.S. Cl.
CPC ........ *G06F 40/166* (2020.01); *G10L 15/1815* (2013.01); *G10L 15/22* (2013.01); *H04L 51/046* (2013.01); *H04L 51/216* (2022.05); *G10L 2015/088* (2013.01)

(58) Field of Classification Search
CPC ....... H04L 51/216; G06F 16/345; G06F 40/35
See application file for complete search history.

(56) References Cited

U.S. PATENT DOCUMENTS

| | | |
|---|---|---|
| 10,529,336 B1 | 1/2020 | Matthews et al. |
| 10,977,258 B1 * | 4/2021 | Liu ..................... G06F 21/6245 |
| 11,822,885 B1 | 11/2023 | Sundararaman et al. |
| 2008/0300872 A1 | 12/2008 | Basu |
| 2015/0117662 A1 | 4/2015 | Kulavik et al. |
| 2018/0192141 A1 | 7/2018 | Akumiah et al. |

(Continued)

OTHER PUBLICATIONS

Patent Cooperation Treaty; Notification of Transmittal of the International Search Report and the Written Opinion of the International Searching Authority issued in PCT Application No. PCT/US2024/030532, mailed Aug. 7, 2024; 1 page.

(Continued)

*Primary Examiner* — Daniel Abebe

(74) *Attorney, Agent, or Firm* — Fish & Richardson P.C.

(57) ABSTRACT

A method includes receiving text corresponding to a conversation between two or more people, receiving information for use in customizing a summary of the conversation that is to be generated, and generating the summary of the conversation that is customized according to the received information. The summary of the conversation is generated by feeding the received text and the received information into an artificial intelligence model that uses the received text and the received information as inputs. A system includes a network interface and a processor-based system configured to receive text corresponding to a conversation between two or more people, receive information for use in (Continued)

customizing a summary of the conversation that is to be generated, and generate the summary of the conversation that is customized according to the received information.

26 Claims, 4 Drawing Sheets

(56) References Cited

U.S. PATENT DOCUMENTS

| | | | |
|---|---|---|---|
| 2018/0349502 A1 | 12/2018 | Maycock | |
| 2019/0028362 A1 | 1/2019 | Kim et al. | |
| 2019/0164539 A1 | 5/2019 | Schmidt et al. | |
| 2019/0327362 A1 | 10/2019 | Herrin | |
| 2020/0311122 A1* | 10/2020 | Ramamurthy | G06N 20/20 |
| 2021/0158458 A1* | 5/2021 | Waldrop | G06Q 10/107 |
| 2022/0115033 A1 | 4/2022 | Huffman et al. | |
| 2022/0407900 A1* | 12/2022 | Gawande | G06F 40/10 |
| 2023/0305682 A1* | 9/2023 | Faulkner | H04N 21/4532 |
| 2024/0079025 A1 | 3/2024 | Hamlin et al. | |
| 2024/0223825 A1 | 7/2024 | Wolowiec et al. | |
| 2024/0297863 A1* | 9/2024 | Lovitt | H04L 51/10 |
| 2024/0314093 A1* | 9/2024 | Mehta | H04L 51/063 |

OTHER PUBLICATIONS

Patent Cooperation Treaty; International Search Report issued in PCT Application No. PCT/US2024/030532, mailed Aug. 7, 2024; 2 pages.
Patent Cooperation Treaty; Written Opinion of the International Searching Authority issued in PCT Application No. PCT/US2024/030532, mailed Aug. 7, 2024; 13 pages.
Wikipedia; "Generative pre-trained transformer"; https://en.wikipedia.org/wiki/Generative_pre-trained_transformer; the first GPT was introduced in 2018; pp. 1-12.
Wikipedia; "ChatGPT"; https://en.wikipedia.org/wiki/ChatGPT; initial release on Nov. 30, 2022; pp. 1-48.
Wikipedia; "OpenAI"; https://en.wikipedia.org/wiki/OpenAI; founded Dec. 11, 2015; pp. 1-47.
Wikipedia; "Large language model"; https://en.wikipedia.org/wiki/Large_language_model; printed on Jul. 24, 2024; pp. 1-27.

* cited by examiner

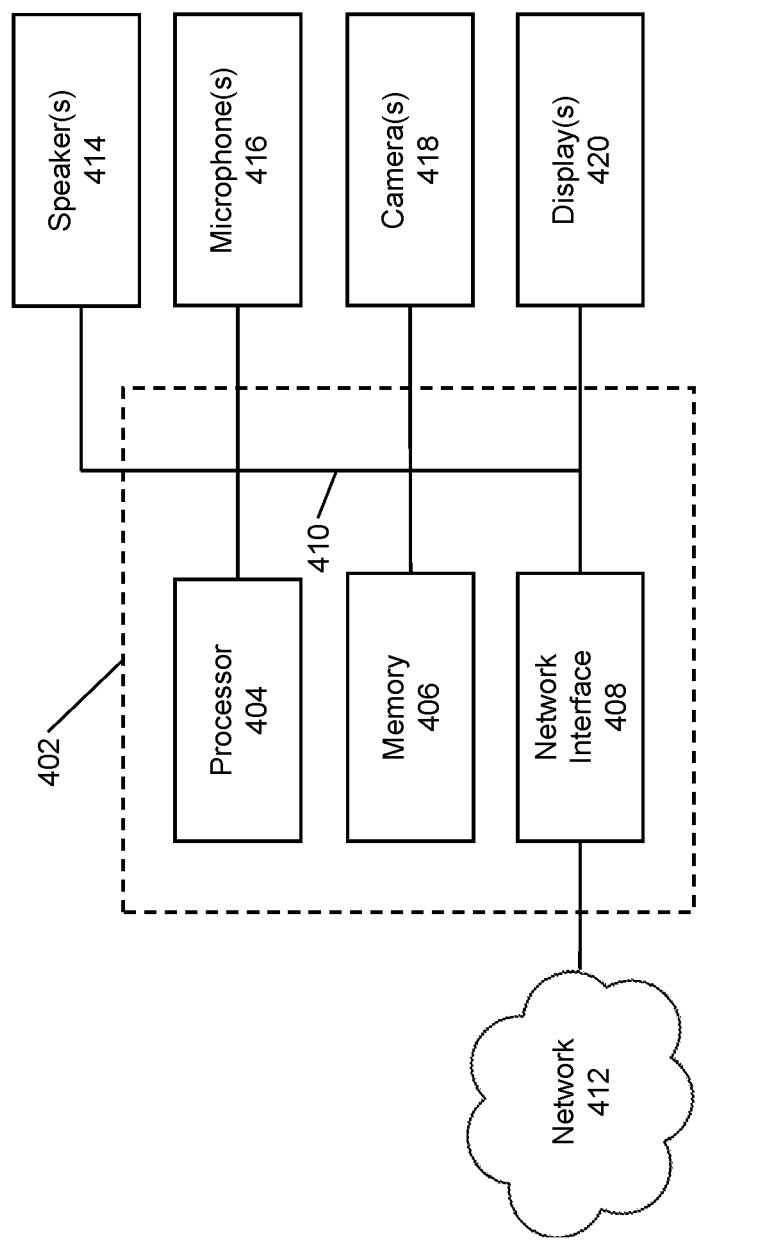

USING ARTIFICIAL INTELLIGENCE TO GENERATE CUSTOMIZED SUMMARIES OF CONVERSATIONS

BACKGROUND OF THE INVENTION

Field of the Invention

Embodiments of the present invention relate generally to interpersonal communication, and more specifically to conversations among people.

Discussion of the Related Art

Many conversations among people, such as conversations that occur during meetings, business meetings, legal proceedings, conferences, get-togethers, gatherings, parties, etc., are oral in nature. That is, the participants of the conversation communicate with each other via spoken words. In contrast, some conversations among people are non-oral in nature, such as conversations carried out with written words rather than spoken words. These types of conversations, for example, can be conducted via mobile text messaging, instant messaging applications, online chat applications, etc.

SUMMARY OF THE INVENTION

One embodiment provides a method, comprising: receiving text corresponding to a conversation between two or more people; receiving information for use in customizing a summary of the conversation that is to be generated; and generating the summary of the conversation that is customized according to the received information, wherein the summary of the conversation is generated by feeding the received text and the received information into an artificial intelligence model that uses the received text and the received information as inputs.

Another embodiment provides a non-transitory computer readable storage medium storing one or more computer programs configured to cause a processor-based system to execute steps comprising: receiving text corresponding to a conversation between two or more people; receiving information for use in customizing a summary of the conversation that is to be generated; and generating the summary of the conversation that is customized according to the received information, wherein the summary of the conversation is generated by feeding the received text and the received information into an artificial intelligence model that uses the received text and the received information as inputs.

Another embodiment provides a system, comprising: a display; a network interface; and a processor-based system coupled to the display and the network interface and configured to execute steps comprising, receiving text corresponding to a conversation between two or more people; receiving information for use in customizing a summary of the conversation that is to be generated; and generating the summary of the conversation that is customized according to the received information, wherein the summary of the conversation is generated by feeding the received text and the received information through the network interface and into an artificial intelligence model that uses the received text and the received information as inputs.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF DRAWINGS

The above and other aspects, features and advantages of embodiments of the present invention will be more apparent from the following more particular description thereof, presented in conjunction with the following drawings wherein:

FIG. 4 is a block diagram illustrating a system that includes a processor-based system or apparatus that may be used to run, implement, and/or execute many of the methods, schemes, and techniques shown and described herein in accordance with some embodiments of the present invention.

DETAILED DESCRIPTION

Figure 1:
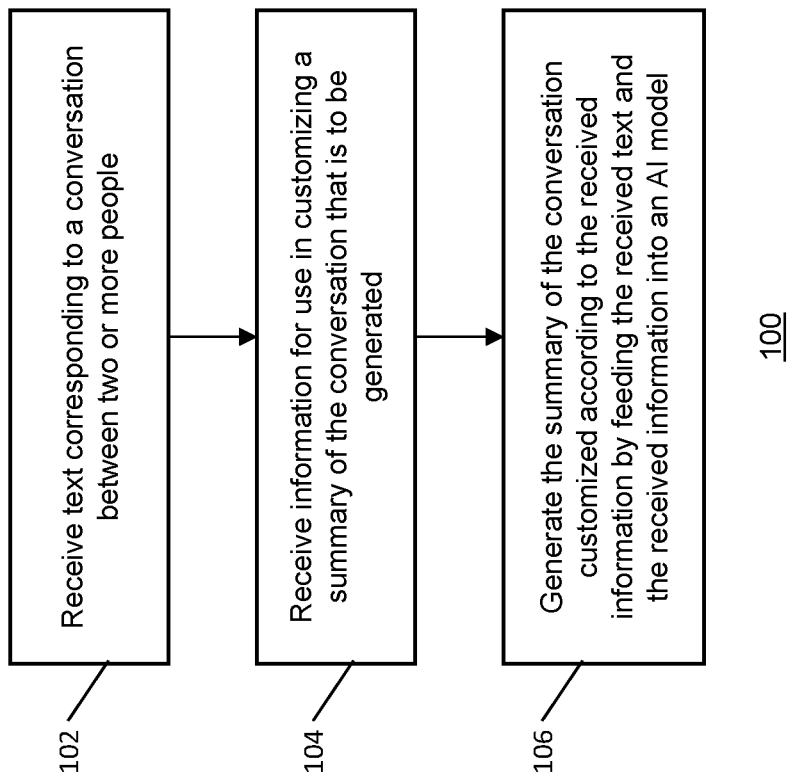
FIG. 1 is a flow diagram illustrating a method in accordance with some embodiments of the present invention.

Oral conversations among people, particularly in business settings such as business meetings and legal proceedings, are often recorded. Sometimes only audio is recorded, and sometimes both audio and video are recorded. Such conversations can take place in person, such as several people located and speaking in the same conference room, which can be recorded using audio and/or video recording equipment. Such conversations can also take place via conference-type telephone calls with the participants being in different locations, the audio of which can be recorded. And increasingly, such conversations take place via videoconferencing, again with the participants being in different locations. There are several available communication platforms that support videoconferencing, some of which provide the ability for the audio and/or video to be recorded.

The recorded audio from any of the above-described types of oral conversations is often transcribed into text. This provides a written transcript of exactly what was said during the conversation. Software is available for converting audible speech to text.

With non-oral conversations carried out with written words rather than spoken words, the text of the conversation can typically be saved with whatever application is being used to conduct the conversation. As such, a written transcript of exactly what was said during the conversation is easily obtained without the need for converting audible speech to text.

Asynchronous communication methods like email and text chat allow people who were not available during the real-time conversation to scroll back through time and catch up on what was missed. However, if someone misses out on a real-time oral (i.e., voice) conversation, it is much more difficult—if not impossible—to catch up on what was said while the person was away. If the conversation was recorded or transcribed, then the missing person could go back and review the missed conversation, but that would require actually listening to or re-reading potentially hours of conversation to extract only a few relevant points of interest. It is difficult to separate the signal from the noise; that is, it is difficult to separate the relevant information from the irrelevant information.

In some embodiments, the present invention provides for the preparation of summaries of conversations for people who missed out on the conversation. In some embodiments, the present invention uses artificial intelligence (AI) to summarize real-time conversations for people who missed out on the conversation. For example, in some embodiments, by using AI and/or machine learning (ML) techniques, the recording of a real-time conversation can be analyzed by the AI to create a short summary of the conversation, with only the most relevant points included in the summary. Furthermore, in some embodiments, the AI can incorporate an understanding of the target audience for the summary, and then tailor a custom summary to the specific interests of the audience.

For example, imagine a workshop about AI content generation. There are ten people in the workshop talking in real time for three to four hours. That conversation is recorded and transcribed by available methods. If someone who was interested in ideas about AI text generation, and only AI text generation, wanted to understand what was discussed about that topic during the workshop, he or she would have to listen to the full three to four hours of audio recording, or would need to scroll through the transcript trying to eyeball where discussion about AI text generation happened.

However, with some embodiments of the present invention, that same person could simply request a personalized summary of the workshop. In some embodiments, if there was only an audio recording, that recording would first be converted to text via speech-to-text methods. That text would then be analyzed by an AI or ML model to generate a summary of the workshop focused specifically on AI text generation. Discussion of AI image generation, AI video generation, etc., would be excluded from the summary.

FIG. 1 illustrates a method 100 in accordance with an embodiment of the present invention. In some embodiments, the method 100 is executed by a processor-based system or apparatus, an example of which will be discussed below.

In some embodiments, the method 100 uses AI to generate a customized summary of a conversation. Specifically, the method 100 begins with step 102 in which text is received. In some embodiments, the received text corresponds to a conversation between two or more people. For example, in some embodiments, the conversation may have occurred during a meeting, business meeting, legal proceeding, conference, get-together, gathering, party, etc. In some embodiments, the conversation may comprise a series of messages, comments, chat entries, posts, tweets®, or any other message or entry in an online forum, chat room, posting board, etc., such as for example any social media application or platform.

In some embodiments, the conversation may have been an oral (i.e., spoken) conversation, and the text of the conversation may be created by transcribing an audio recording using speech-to-text methods. In some embodiments, the text of the conversation may be created by transcribing the conversation in real time. In some embodiments, the conversation may have been a non-oral conversation carried out with written words rather than spoken words. In this scenario, the text of the conversation may have been saved with whatever application or device is used to conduct the conversation.

In step 104, information is received that is used for customizing a summary of the conversation that is going to be generated. In some embodiments, the received information is configured, adapted, and/or intended for use in customizing a summary of the conversation that is to be generated. In some embodiments, the received information may comprise any type of information and may fall anywhere along a range of specificity, such as general topics, to more focused topics, to general parameters, to specific parameters. For example, in some embodiments, the received information may comprise, but is not limited to, any one or more of the following: one or more keywords; one or more topics; an identity of a person for whom the summary is generated; information from a user profile associated with a person for whom the summary is generated; an identity of an audience for whom the summary is generated; or a level of detail to be included in the summary. Examples of these and other types of received information will be discussed below.

In step 106, the summary of the conversation is generated. In some embodiments, the summary of the conversation is generated so that it is customized according to the received information. For example, in some embodiments, the received information is used to develop an understanding of the target audience and/or target focus for the summary. A custom summary is then tailored to the specific interests of the audience or according to the target focus.

In some embodiments, the summary of the conversation is generated by feeding the received text and the received information into an artificial intelligence (AI) model that uses the received text and the received information as inputs. In some embodiments, any type of AI model and/or technology may be used, including any type of machine learning (ML) and/or deep learning models or technology. For example, in some embodiments, any of the generative pre-trained transformer (GPT) family of artificial intelligence large language models (LLMs) may be used, including any of the "GPT-n" series of GPT foundation models developed by OpenAI of San Francisco, California. Namely, any of the GPT-1, GPT-2, GPT-3, GPT-4, or future version GPT foundation models may be used, as well as any GPT foundation models developed by other organizations or companies. In some embodiments, the ChatGPT artificial intelligence chatbot/generative pre-trained transformer model, also developed by OpenAI, may be used.

Many different types of customized conversation summaries may be generated in accordance with various embodiments of the present invention. For example, in some embodiments, personalized summaries may be generated. Specifically, in some embodiments, the personalization of the summary may be accomplished in a few different ways. In some embodiments, the person requesting the summary could enter a few topical keywords into a text user interface (UI). In some embodiments, such keywords may comprise the received information described above that is used for customizing the summary of the conversation that is going to be generated. For example, he or she might request a summary of the workshop about "AI text generation." That query could be passed to an AI model which understands permutations of that query phrase, such as "AI content generation," along with relevant topics such as "GPT-3." In some embodiments, using this expanded understanding of the query, the system may then analyze the transcript of the workshop and assemble a summary of the relevant topics that were discussed.

In some embodiments, another form of personalization could come from a user profile of the person requesting the summary. In such embodiments, the person has some sort of profile that contains information about his or her interests. This could be done through keywords or tags that the person manually inputs, or it could be derived by analyzing the person's previous web searches, previous articles they have read, previous conversations, social media posts, etc. When the person requests a summary of the workshop, the system could first look at the profile to find matches between interests in the profile and things discussed during the workshop (derived from an AI analysis of the transcript). In some embodiments, information from the user profile associated with the person for whom the summary is generated may comprise the received information described above that is used for customizing the summary of the conversation that is going to be generated. The system could then generate a summary of the workshop tailored to the interests in the user's profile.

In some embodiments, the summary may be customized for an audience or group. For example, instead of the summary being personalized for a specific person, it may be personalized for a specific audience instead. For example, an executive summary for a meeting presentation might have different requirements than a summary for a marketing brochure or an elementary school textbook. Summaries for different audiences may require different levels of detail, more simple or complex language, a more formal or casual tone, different language translations, the expansion or contraction of acronyms (e.g., IRS for an audience familiar with taxes, but Internal Revenue Service for a less knowledgeable audience), etc.

In some embodiments, the AI model can leverage its contextual and semantic understanding of different types of text sources to generate summaries for the appropriate audiences. For example, a user might ask for "a summary of the workshop for a company newsletter" and the system would analyze previous company newsletters to determine the proper length, tone, level of detail, etc. A different user might ask for "a summary of the workshop for senior executives," and the system would base its output on an analysis of executive summaries from other presentations. In either case, the information in quotation marks asked for by the user may comprise the received information described above that is used for customizing the summary of the conversation that is going to be generated.

In some embodiments, the received information used for customizing the summary of the conversation that is going to be generated may comprise information relating to or specifying the granularity of the summary. For example, in some embodiments, the level of detail for the summary may be adjusted by the user. The user may request, for example, a short, medium, or long summary, and the system would adjust the amount of information included in the summary accordingly. Alternatively, in some embodiments, the user may be provided with a slider, dial, or other user interface to "dial up" or "dial down" the amount of information included in the summary. In some embodiments, the summary may be re-rendered in real time, so the user can get immediate feedback on how much detail their adjustments are adding or removing.

In some embodiments, the summary may be customized to include verbatim text highlighting. Specifically, in some cases, a summary may be insufficient—the person may want to see what was discussed about a topic verbatim. If the user has a transcript of the workshop, the best they can do is guess keywords and CTRL-F to find those keywords in the transcript. This is a very lossy method since they might miss entire blocks of relevant conversation where the keywords were not mentioned.

By using some embodiments of the present invention, the user can search for a keyword, and the system can analyze the transcript to find portions of the conversation that are semantically and contextually relevant to the keyword. In some embodiments, the system may then highlight the relevant segments of the transcript in some way, such as with a color highlight. Furthermore, in some embodiments, this highlighting may be color coded to convey some level of confidence in the analysis. For example, a green highlight could indicate high confidence that the portion of the conversation is relevant to the query. Yellow could indicate medium confidence, and red could indicate low confidence. Confidence below a certain threshold may not be highlighted at all. In some embodiments, such verbatim text highlighting may be requested by including in the received information a request for the summary to include one or more portions of verbatim text.

In some embodiments, the summary may be customized to include a topical "highlight reel". For example, the system may generate a highlight reel by editing together the relevant portions of the audio and/or video of the workshop into a short audio/video summary. This allows the users to see/hear the intonation and/or facial expressions of the speakers to understand tone and non-verbal cues. In some embodiments, the transcript of the workshop may be timestamped, which may help to facilitate the generation of a highlight reel. In some embodiments, a highlight reel may be provided with or without a written summary of the conversation. In some embodiments, a highlight reel may be requested by including in the received information a request for the summary to include a highlight reel.

In some embodiments, a general summary may be provided. For example, there might be cases where the person requesting the summary is not interested in any particular topic, but rather wants a general understanding of what was discussed. This general summary may be created in a number of different ways.

In some embodiments, the system first analyzes the text to determine the topics of discussion, then analyzes it again for each topic so that it can provide a topical summary. For example, it might summarize everything discussed about AI art generation first (e.g., under a header "AI Art Generation"), then summarize AI text generation, then AI video generation.

In some embodiments, the summary is generated in chronological order, which would better reflect the ebb and flow of the conversation. This summary would show where the conversation returned to a topic after originally moving on. For example, "First, Charlie discussed how Midjourney is particularly good at artistic expression. Then, Warren talked about how DALL-E2 is better at stock photography. Next, Celeste returned to Midjourney to talk about its flaws in generating human faces."

In some embodiments, general summaries may be requested by, for example, using keywords such as "topical general summary" and "chronological general summary" as the received information used for customizing the summary of the conversation that is going to be generated.

In some embodiments, the summary may be customized to include attribution. Specifically, if the conversation is audio-only, there may be a problem with attribution: who said what. In some embodiments, this can be solved by first analyzing the transcript to find any portions of the conversation where a speaker is clearly identified.

For example, the participants may have introduced themselves at the beginning of the call. The AI model would recognize that the person speaking is introducing themselves based on textual and contextual information. It can then recognize that any time it hears the same voice, it is the person with that voice who previously introduced himself or herself. Or maybe a moderator calls on a specific person: "John, what do you think?" The system could then understand that the next person who speaks is likely John. Any further utterances by the same voice can then be attributed to John.

In some embodiments, another way of recognizing who belongs to which voice can be through facial recognition. For example, in cases where there is a video chat paired with the audio conversation, frames of the video chat can be compared to a database of images of known people (e.g., an employee directory). The system would then be able to derive the name of the person speaking by recognizing that the face in the corresponding video chat matches a specific face in the image database. Any further utterances by that face would then be attributed to the same person recognized from the database.

In some embodiments, attribution may be requested by including in the received information a request for the summary to include attribution to the appropriate people. The resulting summary of the conversation would include an indication of who said what.

Figure 2:
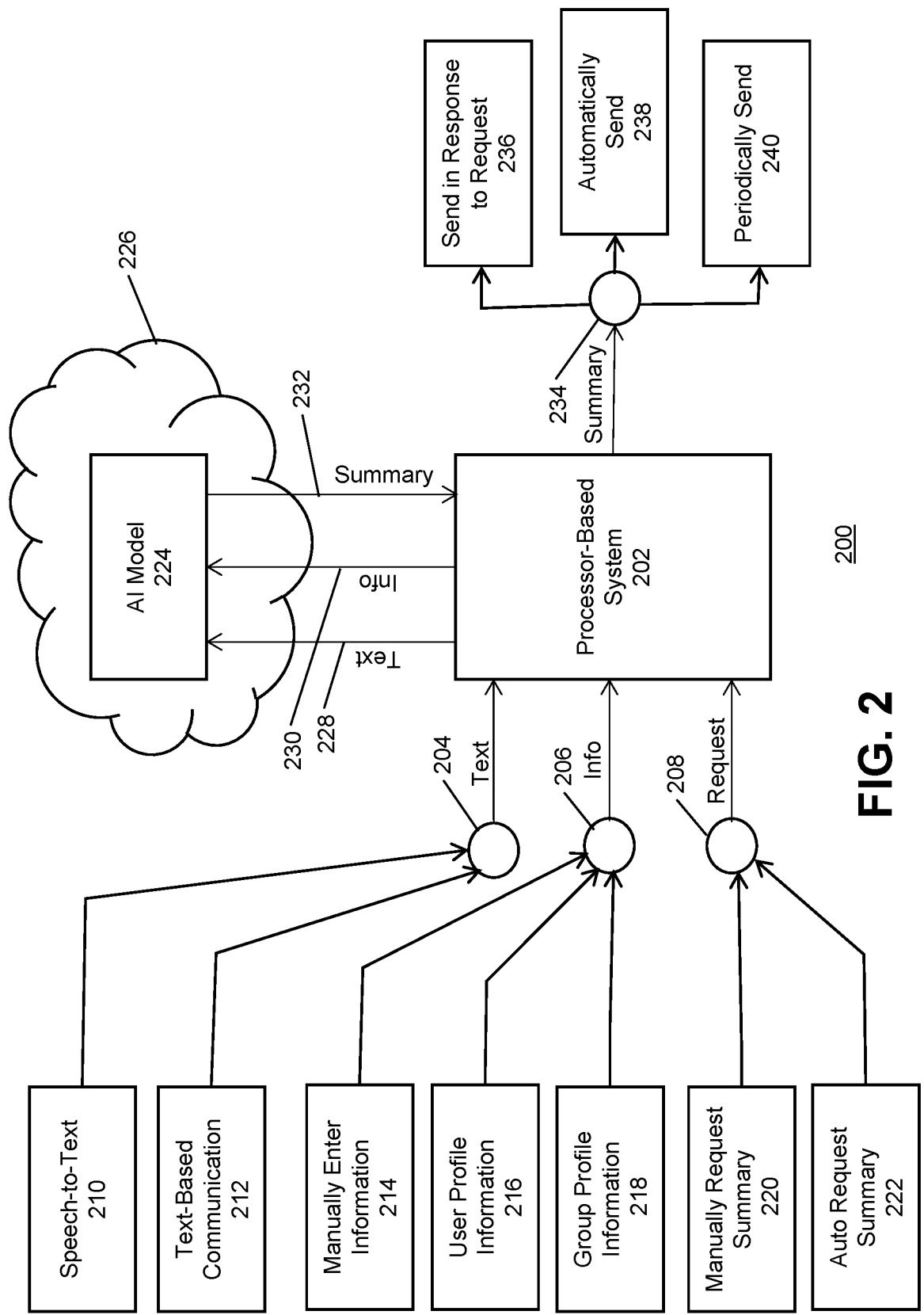
FIG. 2 is a functional block diagram illustrating a system in accordance with some embodiments of the present invention.

FIG. 2 illustrates a system 200 in accordance with an embodiment of the present invention. The system 200 includes a processor-based system 202, which in some embodiments, may be configured to execute the method 100 (FIG. 1).

The processor-based system 202 includes a text input 204 for receiving text corresponding to a conversation between two or more people, and an information input 206 for receiving information for use in customizing a summary of the conversation that is to be generated. Also shown in the illustrated embodiment is a request input 208 for receiving a request to generate a summary of a conversation.

The text input 204 can receive text from speech-to-text block 210, which in some embodiments represents any type of platform, system, or device in which oral conversations are converted to text either from audio recordings or in real time while the oral conversations are taking place. Examples include, but are not limited to, in-person conversations using audio and/or video recording equipment, conference-type telephone calls, videoconferencing platforms, etc.

The text input 204 can also receive text from text-based communication block 212, which in some embodiments represents any type of platform, system, or device in which non-oral conversations are carried out with written words rather than spoken words. Examples include, but are not limited to, mobile text messaging, instant messaging applications, online chat applications, etc., as well as messages, comments, chat entries, posts, tweets®, or any other message or entry in an online forum, chat room, posting board, etc., such as for example any social media application or platform.

The information input 206 can receive information from manual entry block 214, which in some embodiments represents any type of manual entry of the information for use in customizing a summary of the conversation that is to going be generated. Examples include, but are not limited to, a user typing in or otherwise entering the information into a user interface. In some embodiments, the information may include keywords, topics, interests, subjects, general parameters, specific parameters, or any other information for use in customizing, tailoring, or focusing the summary that is requested and going to be generated.

The information input 206 can also receive information from user profile information block 216, which in some embodiments represents the use of information comprising information from a user profile associated with a person for whom the summary is generated. That is, in some embodiments, information from a user profile associated with the person for whom the summary is generated may comprise the received information that is used for customizing the summary of the conversation that is going to be generated. In some embodiments, the system may receive an identity of a person for whom the summary is generated. The system can use the identity of the person to find the person's user profile, and then use information from the user profile as the received information that is used for customizing the summary.

The information input 206 can also receive information from group profile information block 218, which in some embodiments represents the use of information comprising information from a group profile associated with a group for whom the summary is generated. That is, in some embodiments, information from a group profile, audience profile, description, or demographic associated with the intended audience for whom the summary is generated may comprise the received information that is used for customizing the summary of the conversation that is going to be generated. In some embodiments, the system may receive an identity of an audience or group for whom the summary is generated. The system can use the identity of the audience or group to find the group profile, and then use information from the group profile as the received information that is used for customizing the summary.

The request input 208 can receive a request from manual request block 220, which in some embodiments represents any type of manual requesting of a customized summary of a conversation. Examples include, but are not limited to, a user typing in or otherwise entering into a user interface a request to generate a summary of a conversation. As another example, in some embodiments, the conversation may comprise an online conversation or chat between two or more people that is carried out in text or/and audio. The summary of the conversation may be generated in response to a user requesting the summary via an online request, such as for example by clicking on a request button included on the website or application hosting the online chat.

The request input 208 can also receive a request from automatic request block 222, which in some embodiments represents any type of scenario in which a summary of a conversation is automatically generated. For example, a person scheduled to attend a conversation, such as a videoconference, may have been a no-show, i.e., the person did not attend the conversation. In some embodiments, an indication is generated, such as by the videoconferencing platform or application, that the person did not attend. In response to that indication, the system will automatically generate a summary of the conversation for the person that did not attend. In some embodiments, the system will then send the summary to the person that did not attend, such as by email, text message, via a messaging application, via the videoconferencing platform, etc. Thus, in some embodiments, the generation of a summary of a conversation is performed automatically in response to such an indication.

In some embodiments, once the processor-based system 202 receives the text of the conversation, the information, and the request, it proceeds to generate a summary of the conversation. In some embodiments, the text of the conversation comprises text corresponding to two or more conversations between two or more people that took place at different times. This can occur, for example, in scenarios such as customer service telephone calls or text chats where a customer may have had several different telephone calls or text chats with different customer service representatives spread out over several days or weeks. In such scenarios the customer and/or the representative may want one single summary that summarizes all of the several different telephone calls or chats. Such a summary can help the customer and the representative quickly come back up to speed on the status of the issues at hand. In some embodiments, the summary of the conversation can be generated based on the received text corresponding to the two or more conversations that took place at different times.

In some embodiments, the processor-based system 202 generates the summary of the conversation so that it is customized according to the received information. In some embodiments, the processor-based system 202 generates the summary of the conversation by feeding the received text 228 and the received information 230 into an artificial intelligence (AI) model 224 that uses the received text and the received information as inputs. In some embodiments, the AI model 224 may be located in the cloud 226. That is, in some embodiments, the AI model 224 may be located remotely from the processor-based system 202 and accessible via a network, such as the Internet, or some other network. However, in some embodiments, the AI model 224 may be located locally with the processor-based system 202.

In some embodiments, the AI model 224 may comprise or utilize any of the AI, ML, or deep learning technologies or models discussed above, or any other AI technology or model.

In some embodiments, the AI model 224 generates the summary of the conversation so that it is customized according to the received information. The AI model 224 then sends the customized summary 232 back to the processor-based system 202.

In some embodiments, once the processor-based system 202 receives the customized summary from the AI model 224, it then proceeds to send the summary to the intended recipient(s) via the summary output 234. In some embodiments, the summary may be sent to the intended recipient(s) via any means, such as for example by email, text message, instant message, messaging applications, messaging within communication platforms, push notifications, etc.

In some embodiments, the summary can be sent to the intended recipient(s) via the send in response to request block 236, which in some embodiments represents the sending of the summary to a user in response to that user's one time request for a summary.

In some embodiments, the summary can also be sent to the intended recipient(s) via the automatically send block 238, which in some embodiments represents the automatic sending of the summary, such as for example in response to an indication that the recipient did not attend a conversation as scheduled, as described above.

In some embodiments, the summary can also be sent to the intended recipient(s) via the periodically send block 240, which in some embodiments represents not only the automatic sending of the summary, but the automatic sending of the summary at periodic intervals. For example, in some embodiments, a person scheduled to attend a conversation, such as a videoconference, may be running late and/or unable to attend the conversation, but that person wants to receive real-time updates of what is being discussed in the conversation. With this option, in some embodiments, the processor-based system 202 receives text corresponding to the conversation periodically in real time while the conversation is taking place. The processor-based system 202 generates the summary of the conversation as described herein, and then periodically updates the summary of the conversation in real time as additional text corresponding to the conversation is received. The processor-based system 202 then periodically sends the updated summary of the conversation to a device (e.g., a mobile device, computer, etc.) associated with the person who wants the updates, such as for example a person who is not attending the conversation but wants to be updated on what is being discussed.

Figure 3:
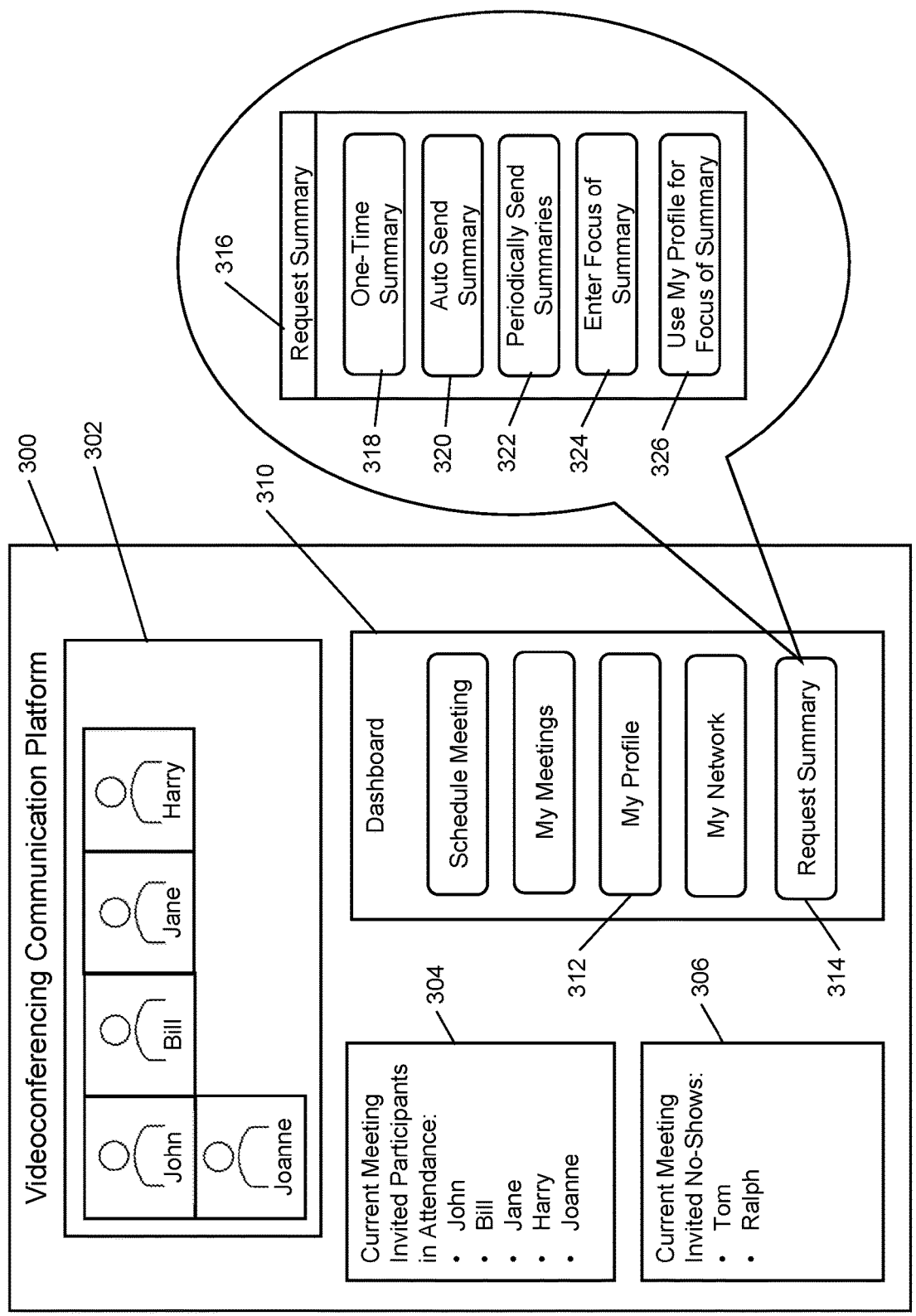
FIG. 3 is a screen view diagram illustrating a user interface (UI) of a videoconferencing communication platform in accordance with some embodiments of the present invention.

FIG. 3 illustrates a user interface (UI) 300 of a videoconferencing communication platform in accordance with an embodiment of the present invention. The videoconferencing communication platform and the UI 300 incorporate and include many of the methods, techniques, and features described herein.

The UI 300 includes a screen 302 on which the participants of a current conversation, such as a meeting, business meeting, etc., are displayed. Block 304 displays the names of the invited (or scheduled) participants of the current meeting that are in attendance. Block 306 displays the names of the invited participants of the current meeting that are no-shows, i.e., that are not in attendance.

A dashboard 310 provides several options that are available to the user. For example, in the illustrated embodiment, a "my profile" button 312 is provided. In some embodiments, the "my profile" button 312 allows the user to create, edit, and maintain a user profile. In some embodiments, the user profile includes one or more fields in which the user can provide information that can be used for customizing summaries of conversations as described herein. In some embodiments, the information may include keywords, topics, interests, subjects, general parameters, specific parameters, or any other information for use in customizing, tailoring, or focusing a summary of a conversation that is requested. In some embodiments, the information may further include, or the user profile itself may include, information about the user that can also be used for customizing, tailoring, or focusing a summary of a conversation, such as for example the user's occupation, corporate position title, professional experience, etc.

In the illustrated embodiment, the dashboard 310 also includes a "request summary" button 314. In some embodiments, the "request summary" button 314 allows the user to request summaries of conversations, such as meetings, etc., that take place within the videoconferencing communication platform. In some embodiments, the videoconferencing communication platform includes programming code, software, technology, etc., for implementing and/or executing the methods, techniques, and features described herein. For example, in some embodiments, the videoconferencing communication platform includes or accesses speech-to-text technology for converting oral conversations to text. Furthermore, in some embodiments, the videoconferencing communication platform includes programming code, software, technology, etc., for coordinating, routing, and feeding text of conversations and customization information to an AI model as described herein.

In some embodiments, when the "request summary" button 314 is pressed, a "request summary" menu 316 opens. The "request summary" menu 316 provides several options that are available to the user. For example, in some embodiments, a "one-time summary" button 318 is provided, which allows the user to request a one-time summary of a conversation.

In some embodiments, an "auto send summary" button 320 is provided, which allows the user to request that summaries be sent to the user automatically. In some embodiments, the "auto send summary" button 320 provides further configuration options, such as an option to select which conversations will trigger an automatic summary. For example, in some embodiments, the user can select that summaries be automatically sent to the user for any meeting that the user misses or otherwise fails to attend, similar to as described above. For example, it was mentioned above that block 306 displays the names of the invited participants of the current meeting that are no-shows, i.e., that are not in attendance. In some embodiments, those no-shows can automatically be sent a summary of the current meeting if they have selected the "auto send summary" button in their own user dashboard.

In some embodiments, a "periodically send summaries" button 322 is provided, which allows the user to request that summaries be sent to the user periodically in real time while a conversation is taking place. In some embodiments, the "periodically send summaries" button 322 provides further configuration options, such as an option to select which conversations will trigger periodically sent summaries. For example, in some embodiments, the user can select that summaries be periodically sent to the user in real time while the conversation is taking place for any meetings for which the user is late in arriving, similar to as described above. For example, perhaps the no-shows listed in block 306 for the current meeting are merely running late and would like to receive updates while they are on their way to the meeting. In some embodiments, those no-shows can receive periodically sent summaries in real time while the current meeting is taking place if they have selected the "periodically send summaries" button in their own user dashboard.

In some embodiments, an "enter focus of summary" button 324 is provided, which allows the user to enter information that can be used for customizing summaries of conversations as described herein. In some embodiments, the information may include keywords, topics, interests, subjects, general parameters, specific parameters, or any other information for use in customizing, tailoring, or focusing a summary of a conversation that is requested.

In some embodiments, a "use my profile for focus of summary" button 326 is provided, which allows the user to indicate to the system that information in the user's profile should be used for customizing summaries of conversations as described herein. Thus, in some embodiments, information in the user's profile would be used for customizing summaries, as described above.

It was mentioned above that the method 100 (FIG. 1) may be executed by a processor-based system or apparatus. FIG. 4 illustrates an example of a system 400 that includes a processor-based system or apparatus 402 in accordance with an embodiment of the present invention. In some embodiments, the processor-based system or apparatus 402, or the entire system 400, may be used for implementing, executing, or practicing many of the methods, schemes, techniques, systems, or devices described herein. For example, in some embodiments, the processor-based system or apparatus 402, or the entire system 400, may be used as the processor-based system 202 (FIG. 2). However, the use of the processor-based system or apparatus 402 or the system 400 or any portion thereof is certainly not required.

In some embodiments, the processor-based system or apparatus 402 may comprise a computer, desktop computer, notebook computer, workstation, server, portable device, mobile device, pad-like device, smartphone, entertainment system, game console, gaming computer, etc.

In some embodiments, the processor-based system or apparatus 402 includes a processor 404 (e.g., a central processing unit (CPU)), a memory 406, and a wireless and/or wired network interface 408. In some embodiments, the components communicate with each other via connections and/or communications channels 410, which may comprise wired connections, wireless connections, network connections, or a mixture or combination of both wired and wireless connections, communications channels, network connections, buses, etc.

The processor 404 may be used to execute or assist in executing the steps of the methods, schemes, and techniques described herein. For example, in some embodiments, the processor 404 executes code, software, or steps that implements, carries out, and/or facilitates the generation of a summary of a conversation that is customized according to received information, as described herein.

The memory 406 may include or comprise any type of computer readable storage or recording medium or media. In some embodiments, the memory 406 may include or comprise a tangible, physical memory. In some embodiments, the memory 406 may be used for storing program or computer code or macros that implements the methods and techniques described herein, such as program code for running the methods, schemes, and techniques described herein. In some embodiments, the memory 406 may serve as a tangible non-transitory computer readable storage medium for storing or embodying one or more computer programs or software applications for causing a processor-based apparatus or system to execute or perform the steps of any of the methods, code, schemes, and/or techniques described herein. Furthermore, in some embodiments, the memory 406 may be used for storing any needed database(s).

In some embodiments, the wireless and/or wired network interface 408 may be used for accessing a network, such as for example the network 412. The network 412 may comprise the Internet, a local area network, a home network, an office network, a gaming network, an intranet, a wide area network, or any other network. The wireless and/or wired network interface 408 may be used for accessing any needed information or resources on any network for implementing and/or running the methods, schemes, and/or techniques discussed and described herein, such as for example, accessing and communicating with any artificial intelligence (AI) models or technology discussed herein.

In some embodiments, the system 400 includes one or more audio speaker(s) 414. In some embodiments, the one or more audio speaker(s) 414 may comprise audio headphones or audio earbuds. In some embodiments, the one or more audio speaker(s) 414 may be used for listening to any audio, such as for example oral conversations among people.

In some embodiments, the system 400 includes one or more microphone(s) 416. In some embodiments, the one or more microphone(s) 416 may be used for capturing or recording any needed audio, such as for example the voice of a user of the system 400 for participating in oral conversations among people.

In some embodiments, the system 400 includes one or more cameras 418. The one or more cameras 418 may comprise any type of cameras or image capture devices. In some embodiments, the one or more cameras 418 may be used for recognizing and/or identifying people, such as by facial recognition.

In some embodiments, the system 400 includes one or more displays 420. The one or more displays 420 may comprises any type of display devices using any type of display technology and may be used for implementing any needed environments. For example, in some embodiments, the one or more displays 420 may be used for displaying any needed user interfaces, communication platforms, websites, messaging applications, etc.

In some embodiments, one or more of the embodiments, methods, approaches, schemes, and/or techniques described above may be implemented in one or more computer programs or software applications executable by a processor-based apparatus or system. By way of example, such processor-based system may comprise a smartphone, tablet computer, virtual reality (VR), augmented reality (AR), or mixed reality (MR) system, entertainment system, game console, mobile device, computer, workstation, gaming computer, desktop computer, notebook computer, server, graphics workstation, client, portable device, pad-like device, communications device or equipment, etc. Such computer program(s) or software may be used for executing various steps and/or features of the above-described methods, schemes, and/or techniques. That is, the computer program(s) or software may be adapted or configured to cause or configure a processor-based apparatus or system to execute and achieve the functions described herein. For example, such computer program(s) or software may be used for implementing any embodiment of the above-described methods, steps, techniques, schemes, or features. As another example, such computer program(s) or software may be used for implementing any type of tool or similar utility that uses any one or more of the above-described embodiments, methods, approaches, schemes, and/or techniques. In some embodiments, one or more such computer programs or software may comprise a VR, AR, or MR application, communications application, object positional tracking application, a tool, utility, application, computer simulation, computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods, schemes and/or techniques. In some embodiments, such computer program(s) or software may be stored or embodied in a non-transitory computer readable storage or recording medium or media, such as a tangible computer readable storage or recording medium or media. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein. For example, in some embodiments the present invention provides one or more non-transitory computer readable storage mediums storing one or more computer programs adapted or configured to cause a processor-based apparatus or system to execute steps comprising any one or more of the embodiments, methods, approaches, schemes, and/or techniques described herein.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
receiving an indication that a conversation between two or more people on an online platform is occurring;
in response to receiving the indication, accessing customization information for use in summarizing the conversation;
receiving text corresponding to the conversation;
providing the received text and the customization information into an artificial intelligence model that uses the received text and the customization information as inputs;
obtaining, as output from the artificial intelligence model, an initial summary of the conversation; and
periodically during the conversation, generating an updated summary of the conversation, including:
receiving additional text corresponding to the conversation;
providing the additional text and the customization information into the artificial intelligence model;
obtaining, as output from the artificial intelligence model, the updated summary of the conversation; and
providing the updated summary of the conversation to a device.

2. The method of claim 1, wherein the accessed customization information is specific to a profile of a particular user comprising (i) one person of the two or more people attending the conversation or (ii) a person that was scheduled to attend the conversation and is not attending the conversation.

3. The method of claim 2, wherein the customization information comprises one or more keywords, and the initial summary and the updated summary are generated based at least in part on the one or more keywords.

4. The method of claim 2, wherein the customization information is derived from the profile of the particular user, the customization information including a level of experience of the particular user relative to a subject matter of the conversation.

5. The method of claim 2, wherein the customization information is derived from the profile of the particular user, the customization information including at least one of an occupation or organizational role of the particular user.

6. The method of claim 1, wherein the customization information indicates a level of detail to be included in the initial summary and the updated summary.

7. The method of claim 1, wherein the customization information comprises a request for the initial summary and the updated summary of the conversation to include one or more of the following:
one or more portions of verbatim text from the received text;
a highlight reel;
a summary of all topics discussed during the conversation between two or more people;
a chronology of topics discussed during the conversation between two or more people; or
attribution to appropriate people.

8. The method of claim 1, wherein summarizing the conversation is responsive to receiving a request to summarize the conversation.

9. The method of claim 2, wherein the device is associated with the particular user.

10. The method of claim 2, wherein:
summarizing the conversation is responsive to receiving a request from the particular user to summarize the conversation via an option provided by the online platform.

11. The method of claim 2, further comprising:
receiving an indication that a person scheduled to attend the conversation between two or more people is not attending the conversation,
wherein:
the summarizing the conversation is responsive to the indication, and
the profile of the particular user is associated with the person that was scheduled to attend the conversation and is not attending the conversation.

12. The method of claim 1, wherein the device is associated with a person who is not attending the conversation between two or more people.

13. The method of claim 1, wherein generating the updated summary of the conversation further periodically during the conversation comprises:
receiving updated customization information;
providing the additional text and the updated customization information into the artificial intelligence model;
obtaining, as output from the artificial intelligence model, the updated summary of the conversation; and
providing the updated summary of the conversation to the device.

14. The method of claim 13, wherein:
the accessed customization information is derived from a profile of a particular user, and
the updated customization information is received as user input from the particular user.

15. The method of claim 13, wherein the updated customization information specifies a request for a greater level of detail; and
the updated summary of the conversation includes a greater level of detail than the initial summary of the conversation.

16. The method of claim 13, wherein the updated customization information specifies a request for a lesser level of detail; and
the updated summary of the conversation includes a lesser level of detail than the initial summary of the conversation.

17. The method of claim 1, wherein:
the customization information specifies a frequency at which the conversation is to be summarized, and
periodically generating the updated summary of the conversation during the conversation is performed at the specified frequency.

18. A non-transitory computer readable storage medium storing one or more computer programs configured to cause a processor-based system to execute steps comprising:
receiving an indication that a conversation between two or more people on an online platform is occurring;
in response to receiving the indication, accessing customization information for use in summarizing the conversation;
receiving text corresponding to the conversation;
providing the received text and the customization information into an artificial intelligence model that uses the received text and the customization information as inputs;
obtaining, as output from the artificial intelligence model, an initial summary of the conversation; and
periodically during the conversation, generating an updated summary of the conversation, including:
receiving additional text corresponding to the conversation;
providing the additional text and the customization information into the artificial intelligence model;
obtaining, as output from the artificial intelligence model, the updated summary of the conversation; and
providing the updated summary of the conversation to a device.

19. The non-transitory computer readable storage medium of claim 18, wherein the customization information is specific to a profile of a particular user comprising (i) one person of the two or more people attending the conversation or (ii) a person that was scheduled to attend the conversation and is not attending the conversation.

20. The non-transitory computer readable storage medium of claim 19, wherein:
summarizing the conversation is responsive to receiving a request from the particular user to summarize the conversation via an option provided by the online platform.

21. The non-transitory computer readable storage medium of claim 19, wherein the one or more computer programs are further configured to cause the processor-based system to execute steps comprising:
receiving an indication that a person scheduled to attend the conversation between two or more people is not attending the conversation,
wherein:
the summarizing the conversation is responsive to the indication, and
the profile of the particular user is associated with the person that was scheduled to attend the conversation and is not attending the conversation.

22. A system, comprising:
a display;
a network interface; and
a processor-based system coupled to the display and the network interface and configured to execute steps comprising:
receiving an indication that a conversation between two or more people on an online platform is occurring;
in response to receiving the indication, accessing customization information for use in summarizing the conversation;
receiving text corresponding to the conversation;
providing the received text and the customization information into an artificial intelligence model that uses the received text and the customization information as inputs;
obtaining, as output from the artificial intelligence model, an initial summary of the conversation; and
periodically during the conversation, generating an updated summary of the conversation, including:
receiving additional text corresponding to the conversation;
providing the additional text and the customization information into the artificial intelligence model;
obtaining, as output from the artificial intelligence model, the updated summary of the conversation; and
providing the updated summary of the conversation to a device.

23. The system of claim 22, wherein the processor-based system is further configured to execute steps comprising:
   converting audio corresponding to the conversation between two or more people into the received text and the additional text.

24. The system of claim 22, wherein the processor-based system is further configured to execute steps comprising:
   running the online platform, the online platform comprising a communication platform application;
   wherein summarizing the conversation is performed in response to an indication generated by the communication platform application.

25. The system of claim 22, wherein the processor-based system is further configured to execute steps comprising:
   establishing a user interface on the display;
   wherein the customization information is received in response to interaction with the user interface.

26. The system of claim 22, wherein the processor-based system is further configured to execute steps comprising:
   establishing a user interface on the display;
   wherein summarizing the conversation is performed in response to interaction with the user interface.

\* \* \* \* \*